US010488266B2

(12) United States Patent
Strandjord et al.

(10) Patent No.: US 10,488,266 B2
(45) Date of Patent: Nov. 26, 2019

(54) LARGE RANGE, HIGH RESOLUTION INTERFEROMETER FOR WIDE RANGE OF SENSING APPLICATIONS

(71) Applicant: Honeywell International Inc., Morris Plains, NJ (US)

(72) Inventors: Lee K. Strandjord, Tonka Bay, MN (US); Glen A. Sanders, Scottsdale, AZ (US); Mitchell Novack, Kenmore, WA (US)

(73) Assignee: Honeywell International Inc., Morris Plains, NJ (US)

( * ) Notice: Subject to any disclaimer, the term of this patent is extended or adjusted under 35 U.S.C. 154(b) by 83 days.

(21) Appl. No.: 15/877,985

(22) Filed: Jan. 23, 2018

(65) Prior Publication Data

US 2019/0049312 A1 Feb. 14, 2019

Related U.S. Application Data

(60) Provisional application No. 62/543,465, filed on Aug. 10, 2017.

(51) Int. Cl.
*G01J 9/02* (2006.01)
*G01B 9/02* (2006.01)
(Continued)

(52) U.S. Cl.
CPC ........ *G01J 9/0246* (2013.01); *G01B 9/02003* (2013.01); *G01B 9/02067* (2013.01);
(Continued)

(58) Field of Classification Search
CPC ... G01J 9/0246; G01B 11/14; G01B 9/02067; G01B 9/02003; G01B 2290/60;
(Continued)

(56) References Cited

U.S. PATENT DOCUMENTS 4,974,961 A 12/1990 Jackson et al.
2003/0091097 A1 5/2003 Yap et al.
(Continued)

OTHER PUBLICATIONS

Azouigui et al., "Transportable distance measurement system based on superheterodyne interferometry using two phase-locked frequency-doubled Nd: YAG lasers", May 25, 2010, pp. 1-6, Review of Scientific Instruments 81, 053112 (2010), Published: Online.
(Continued)

*Primary Examiner* — Hina F Ayub
(74) *Attorney, Agent, or Firm* — Fogg & Powers LLC

(57) ABSTRACT

An interferometer including a master laser, a slave laser and optical elements is provided. The optical elements direct and combine a master laser beam and a slave laser beam into a sensing phase measurement loop to provide a sensing beat signal and a reference phase lock loop to provide a reference beat signal. An electronic circuit portion is coupled to receive the sensing and reference beat signals. The electronic circuit portion includes a clock, at least one numerically controlled oscillator, at least one mixer and an interferometer output. The at least one numerically controlled oscillator has a clock input coupled to the clock. The at least one mixer has a first input to receive the sensing beat signal and a second input to receive an output of the at least one numerically controlled oscillator. The interferometer output is coupled to receive an output of the at least one mixer.

20 Claims, 9 Drawing Sheets

(51) Int. Cl.
 *G01B 11/14* (2006.01)
 *G01P 15/093* (2006.01)
 *G01S 17/36* (2006.01)
 *G01V 1/22* (2006.01)

(52) U.S. Cl.
 CPC ............ *G01B 11/14* (2013.01); *G01P 15/093* (2013.01); *G01S 17/36* (2013.01); *G01V 1/226* (2013.01); *G01B 9/02007* (2013.01); *G01B 9/02027* (2013.01); *G01B 2290/60* (2013.01)

(58) Field of Classification Search
 CPC ............ G01B 9/02027; G01B 9/02007; G01V 1/226; G01S 17/36; G01P 15/093
 See application file for complete search history.

(56) References Cited

U.S. PATENT DOCUMENTS

| 2004/0145798 | A1 | 7/2004 | Greene et al. | |
|---|---|---|---|---|
| 2006/0088074 | A1 | 4/2006 | Johnstone et al. | |
| 2006/0239312 | A1 | 10/2006 | Kewitsch et al. | |
| 2009/0212769 | A1 | 8/2009 | Stoica et al. | |
| 2014/0211211 | A1* | 7/2014 | Qiu | G01C 19/727 356/461 |

OTHER PUBLICATIONS

European Patent Office, "Extended European Search Report from EP Application No. 1818787.9 dated Nov. 2, 2018, from Foreign Counterpart of U.S. Appl. No. 15/877,985", dated Nov. 2, 2018, pp. 1-13, Published in: EP.

Liu et al., "Multi-channel phasemeter and its application in the heterodyne laser interferometry", National Microgravity Laboratory, Institute of Mechanics, Chinese Academy of Science, vol. 58, No. 4: 746-749, Apr. 2015, pp. 1-4, Published in: Beiging, China.

Zucco et al., "A two-wavelength interferometer for space applications", 2014, pp. 1-2, Istituto Nazionale di ricerca metrologica, Published in: Torino, Italy.

* cited by examiner

LARGE RANGE, HIGH RESOLUTION INTERFEROMETER FOR WIDE RANGE OF SENSING APPLICATIONS

CROSS-REFERENCE TO RELATED APPLICATIONS

This application claims priority to U.S. Provisional Application Ser. No. 62/543,465, same title herewith, filed on Aug. 10, 2017, which is incorporated in its entirety herein by reference.

BACKGROUND

Interferometers are widely used in science and industry for the measurement of small displacements, surface topography, and changes in index of refraction of an optical medium. Sensors requiring the sensing of small displacements include accelerometers, seismometers, some forms of Light Imaging Detection and Ranging (LiDAR) and displacement sensors for precision machine and lithography tool positioning. Surface topography applications include manufacturing defect detection, 3D scanning, and facial recognition. Sensors that detect changes in the index of refraction of optical medium include some strain sensors and magnetometers. However, interferometers have had limited use in many of these applications.

Interferometers can measure extremely small displacements on the order of an atomic nucleus. But basic interferometers suffer from extremely short operating ranges because of their inherent sinusoidal output that cycles on the order of every optical wavelength in displacement. Devices can be used to increase the linear operating range of interferometers, but these devices have large Size, Weight and Power (SWaP) and are relatively expensive. Present interferometric based sensors have very limited acceptance in many applications because of their high SWaP and cost.

An example of a known interferometer that is configured to measure the displacement of an object is a Michelson interferometer. With a Michelson interferometer, light from a laser is split into two beams, one that is sent along the sensing leg to the object and the other that sent along a reference leg. A retro-reflector on the object reflects the measurement beam back into the opposite direction, where it is reflected again by the beam splitter/combiner and sent to a photodetector. The reference beam is reflected off a mirror, sent to the beam splitter/combiner, where it too is directed to the photodetector to interfere with the sensing beam. Displacement of the object results in a relative phase change between the sensing and reference beams at the photodetector. The relative phase change causes a change in the detected optical power at the photodetector. The detected optical power as a function of displacement of the object is a raised cosine function. For this configuration, the optical intensity completes one full cycle for a half of a wavelength change in displacement. For a semiconductor laser with a wavelength of 1550 nm, the interferometer output completes one full cycle for every 775 nm change in displacement, hence the high resolution of interferometers. However, most applications require a sensor output that is linear over a much larger range than a few nanometers.

One example of a present method for linearizing the sensor output is to use a linear translation stage in the reference arm of the interferometer. A signal at the photodetector output is used in a feedback loop that controls the linear stage to keep the interferometer at some specified lock point. In this case, the output of the sensor is then the displacement of the linear stage. Not only does the linear stage add significant increases in SWaP and cost to the sensor, but also degrades the sensor performance in terms of minimum detectable displacement, or other measurand such as acceleration.

Another prior art method for linearizing the output of an interferometer is to use an optical heterodyne method. In this method, a reference beam is sent through a frequency shifter, which is most commonly an acousto-optic modulator (AOM), before it is interfered with the sensing beam. By frequency shifting the reference beam, the interference between it and the sensing beam will produce a beat note on the photodiode that is at the frequency difference between the two beams. If the object is at rest, the frequency of the beat note will be the same as the frequency of the RF drive to the AOM. If the object is moving, the difference between the frequency of the beat note and the frequency of the AOM RF drive is proportional to the velocity of the object. To obtain the displacement of the object, the frequency difference between the beat note and the AOM RF drive is integrated. The advantage of this method is that it doesn't require any moving parts like the translation stage in the first method. However, the AOM device is relatively large, requires a lot of electrical power and is expensive. Furthermore, since the frequency change of the beat note is integrated to obtain displacement, noise in the frequency measurement will cause random walk in the sensor output, thus eventually resulting in sensor output saturation. Furthermore, offset errors in the frequency measurement will cause the sensor output of indicated displacement to ramp with time. Because the frequency measurement offset may drift with time or environmental changes, the ramp error in the output will have some degree of uncertainty. Noise and offset errors in the frequency measurement precludes the use of this method from many applications.

SUMMARY

The following summary is made by way of example and not by way of limitation. It is merely provided to aid the reader in understanding some of the aspects of the subject matter described. Embodiments provide interferometer devices with very large linear output range, very high displacement sensitivity while being extremely small, using low power and low cost.

In one embodiment, an interferometer that includes a laser and optics portion and an electronic circuit portion is provided. The laser and optics portion includes a master laser, a slave laser and optical elements. The master laser is used to generate a master laser beam. The slave laser is used to generate a slave laser beam. The optical elements are configured and arranged to direct and combine the master laser beam and slave laser beam to provide a sensing beat signal to a beat signal phase measurement loop and a reference beat signal to a reference phase lock loop that is used at least in part to control the phase of the slave laser. The electronic circuit portion is coupled to receive the sensing beat signal and the reference beat signal. The electronic circuit includes a clock, at least one numerically controlled oscillator, at least one mixer and an interferometer output. The at least one numerically controlled oscillator has a clock input coupled to the clock. The at least one mixer has a first input to receive the sensing beat signal and a second input to receive an output of the at least one numerically controlled oscillator. The interferometer output coupled to receive an output of the at least one mixer.

In another embodiment, still another interferometer is provided that includes a laser and optics portion and an electronic circuit portion. The laser and optics portion includes a master laser to generate a master laser beam, a slave laser to generate a slave laser beam and optical elements. The optical elements are configured and arranged to direct and combine the master laser beam and slave laser beam into a sensing phase lock loop to provide a sensing beat signal and a reference phase lock loop to provide a reference beat signal used at least in part to control the phase of the slave laser. The electronic circuit portion is coupled to receive the sensing beat signal and the reference beat signal. The electronic circuit includes a clock, a first numerically controlled oscillator, a second numerically controlled oscillator, a first mixer, a second mixer and an interferometer output. The first numerically controlled oscillator has a clock input coupled to an output of the clock. The second numerically controlled oscillator has a clock input coupled to the output of the clock. The first mixer has a first input coupled to receive the reference beat signal. The first mixer has a second input coupled to an output of the first numerically controlled oscillator. The first mixer has an output used at least in part to control operation of the slave laser. The second mixer has a first input to receive the sensing beat signal and a second input to receive an output of the second numerically controlled oscillator. The interferometer output is coupled to receive an output of the second mixer. The interferometer output is further coupled to a phase input of the second numerically controlled oscillator.

In yet another embodiment, a method of operating an interferometer is provided. The method includes generating a master laser beam with a master laser and generating a slave laser beam with a slave laser. Optical elements are used to direct one of the master laser beam and the slave laser beam off of an object. A sensing beat signal is created with at least one sensing heterodyne detector in a sensing optical phase lock loop from combined master and slave laser beam signals. A reference beat signal is created with at least one reference heterodyne detector in a reference optical phase lock loop from combined master and slave laser beam signals. The reference beat signal is mixed with an output of at least one oscillator to at least in part control the operation of the slave laser. Moreover, the sensing beat signal is mixed with an output of the at least one oscillator to generate and output of the interferometer, wherein the output of the at least one oscillator is directly proportional to a change of phase of the sensing beat signal from an arbitrary initial phase.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of interferometers employ phase locked lasers, optical heterodyne detection and a novel method involving a phase control of a numerically controlled oscillator (NCO). In embodiments, as discussed in detail below, an input to an oscillator is directly proportional to a phase of a beat note (or beat signal). Embodiments control the oscillator phase directly without controlling its frequency. By controlling the oscillator phase directly and not its frequency, noise in the measurements that will eventually cause the sensor output to walk off is avoided. Embodiments are very sensitive since they achieve a very good signal to noise ratio. In some embodiments, two phase look loops are employed. One phase look loop locks a slave laser to a master laser and the other phase lock loop is used for measuring the phase of the beat note. In some embodiments, the phase lock loops are done in an identical fashion using the same type of numerically controlled oscillator, the same clock and within the same integrated circuit. By employing identical phase lock loop circuits using the same clock, embodiments provide a system with a lot of common mode error protections. In one embodiment, only one oscillator is used with a phase shifter as discussed below.

Figure 1:
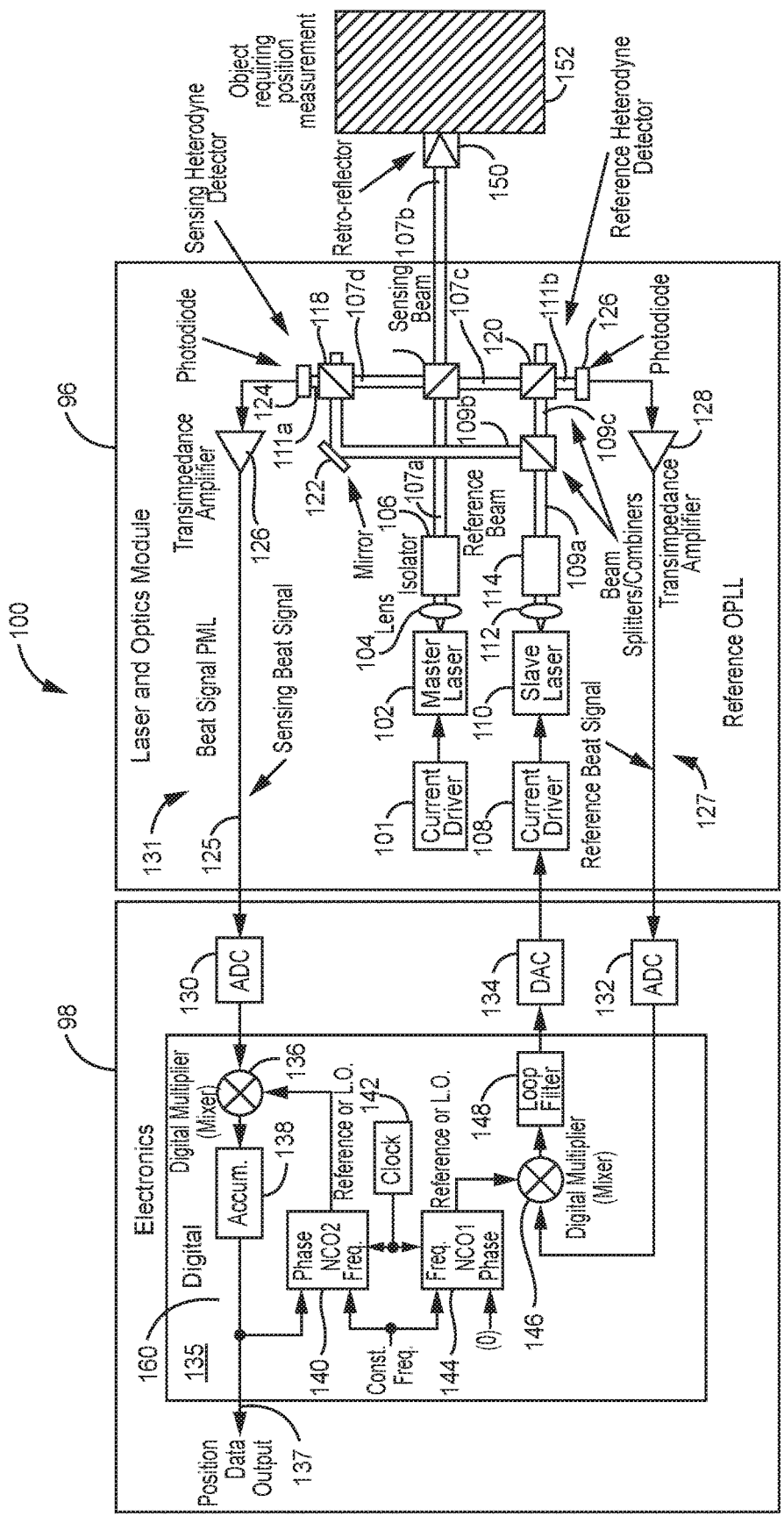
FIG. 1 is a block diagram of an interferometer according to one exemplary embodiment.

One embodiment of an interferometer 100 is shown in FIG. 1. The interferometer 100 includes a retro-reflector 150 that is positioned on an object 152 requiring position measurement, laser and optics portion 96 of the interferometer 100 and an electronic circuit portion 98 of the interferometer 100.

The laser and optics portion 96 of the interferometer 100 includes a master laser assembly, including a current driver 101 for a master laser 102 and a slave laser assembly that includes a slave current driver 108 and a slave laser 110. Optical elements described below are used to direct, split and combine output laser beams from the master and slave lasers 110. The optical elements include lens 104 and isolator 106 that are used to generate a master sensing laser beam 107a from an output of the master laser 102 and lens 112 and isolator 114 to generate a slave reference laser beam 109a from an output of the slave laser 110 in this embodiment. The master beam 107a is split into two beams by beam splitter 116. The first beam 107b is directed to retro-reflector 150, where it is reflected back to beam splitter 116 that splits the reflected sensing beam 107b into two paths with a first reflected sensing beam 107d being directed to a first beam combiner 118 and a second reflected sensing beam being directed back towards isolator 106 where it is greatly attenuated before reaching the master laser 102. The reference laser beam 109a is split into two paths with a first reference beam 109b further reflecting off mirror 122 to the first beam combiner 118 which combines the first reference beam 109b with the first reflected sensing beam 107d. The first combine beams 111a from the first beam combiner 118 are directed to a first photodiode 124. A sensing heterodyne detector includes the beam combiner 118 and the photodiode 124. An output of the photodiode 124 of the sensing heterodyne detector is coupled to a first transimpedance amplifier 126. An output of the first transimpedance amplifier 126 provides a sensing voltage beat signal 125 to the electronic circuit portion 98 and to beat note measurement loop 160. A second reference beam 109c of the split reference beam 109a is directed to the second combiner 120 that combines the second reference beam 109c with second master beam 107c that comes from a portion of master beam 107a reflected down from splitter 116. The second combine beams 111b from the second beam combiner 120 are directed to a second photodiode 126. The second beam combiner 120 and the second photodiode 126 form a reference heterodyne detector. An output of the second photodiode 126 of the reference heterodyne detector is coupled to a second transimpedance amplifier 128. An output of the second transimpedance amplifier 128 provides a reference beat signal 127 in a reference OPLL 129 that is provided to the electronic circuit portion 98. The reference OPLL 129 includes a loop including the slave laser 110, beam combiner 120, photodiode 126, ADC 132, mixer 146, loop filter 148 and back to the slave laser 110.

The electronic circuit portion 98 of the interferometer 100 includes a first Analog to Digital Converter (ADC) 130 that is coupled to receive the sensing beat signal 125 of the laser and optics system 96. Electronic circuit 98 further includes a second ADC 132 that is coupled to receive the reference beat signal 125 of the laser and optics system 96. Further the electronic circuit portion 98 includes a Digital to Analog Converter (DAC) 134 to provide a reference signal (or control signal) to current driver 108 of the laser and optics system 96 which controls operation of the slave laser 110.

Further, the electronic circuit portion 98 includes digital circuitry 135 in this example embodiment. The digital circuitry 135 includes a first mixer 136 that is coupled to receive an output from the first analog to digital converter 130. The digital circuitry 135 in this embodiment includes a first NCO 144 and a second NCO 140. The second NCO 140 includes an output that is coupled to an input of mixer 136. An output of mixer 136 is coupled to an accumulator 138. An output of the accumulator 138 is coupled to a position data output 137 (or interferometer output) of the interferometer 100. The output of the accumulator 138 is also coupled to a phase offset input of the second NCO 140. Hence, in this embodiment, a phase offset input to the second NCO 140 is directly proportional to a change of phase of the sensing beat signal (or beat note) from an arbitrary initial phase.

Digital circuit 135 further includes a second mixer 146 that has a first input coupled to an output of the second ADC 132. A second input to the second mixer 146 is coupled to an output of the first NCO 144. An output of the second mixer 146 is coupled to an input of a loop filter 148. An output of the loop filter 148 is coupled to the DAC 134.

The first NCO 140 has phase offset input and a frequency input. The frequency input of the first NCO 144 is coupled to the frequency input of the second NCO 140. Moreover, a constant frequency input is provided to the frequency input of the first NCO 144 and the frequency input of the second NCO 140. A shared clock 142 in the digital circuitry 135 provides inputs to the first NCO 144 and the second NCO 140.

Interferometer 100 includes a slave laser 110 that is phase locked to a master laser 102 by an OPLL to provide two laser frequencies with high relative stability for heterodyne detection. For a reference OPLL, portions of the master and slave laser beams 111b are mixed at the photodiode 126 of the reference heterodyne detector, and the resulting reference beat signal 127 is digitized and then sent to the second digital mixer (multiplier) 146, where the beat signal 127 is mixed with a digital sinewave signal from the first NCO 144. The output of the second digital mixer 146 indicates a deviation from a 90 degree phase difference between the reference beat note and the first NCO signal. The loop filter 148 provides a frequency dependent gain necessary to provide high loop gain while maintaining loop stability. The digital output of the loop filter 148 is then converted back to an analog drive voltage that controls the injection current of the diode laser, and thus control the optical frequency and phase of the slave laser 110. With sufficiently high loop gain, the reference OPLL maintains a constant relative frequency and phase between the master and slave lasers 102 and 110. The frequency difference between the two lasers 102 and 110 is governed by the first NCO 144. Furthermore, there is a constant phase relationship between the master and slave laser 102 and 110. The method of phase locking a slave laser 110 to a master laser 102 eliminates the need for a large SWaP and expensive AOM in optical heterodyne systems.

For sensing the displacement of some object, a portion of the master light (master laser beam 107b) is directed towards the retro-reflector 150 mounted on the object 152. In some embodiments, a retro-reflector 150 would not be used. For example, in an application detecting nano vibrations in building interior structures, instead of a retro-reflector 150, optical backscattering from the surface of the structure would be used. The retro-reflector 150 reflects the master beam 107b back to the measurement device, where the retro-reflected beam is optically mixed with the slave reference beam 111a at the sensing heterodyne detector 124. The optical mixing produces a beat signal at the frequency difference between the two laser beams. For an object that is stationary, the sensing beat signal frequency is the same is the reference beat signal frequency, which is the same as the first NCO 144. The phase of the sensing beat signal is proportional to the displacement of the object 152. Embodiments employs a novel technique for measuring the sensing beat signal phase with high resolution over a large linear range.

The sensing beat signal 125 in a beat signal phase measurement loop 131 is digitized then mixed with a digital sinewave from second NCO 140 by the first digital mixer (multiplier) 136. Just like in the reference OPLL, the digital mixer output indicates a deviation from a 90 degree phase difference between the sensing beat note and the second NCO 140, which is configured to be at the same frequency and phase coherent with the first NCO 144. The output of the first digital mixer 136 in the beat single phase measurement loop 131 is used as an error signal in a feedback loop that keeps the phase of the second NCO 140 always at 90 degrees relative to the phase of the sensing beat signal 125.

In prior art devices, the feedback in such a phase lock loop controls the frequency of an NCO by controlling the NCO frequency input command, which is the phase increment value of the NCO. Embodiments employ the novel approach by controlling the phase offset of the NCO, which directly controls the phase of the NCO output, not the frequency. A digital integrator controls the second NCO 140 phase offset to always keep the time average error signal at zero. In the beat note (signal) phase measurement loop 131 the phase of the second NCO 140 output sinewave will track any phase changes in the sensing beat signal due to displacement of the object. The indicated displacement is then the second NCO 140 phase offset word.

As long as the measurement devices optics are made with very low thermal expansion materials and made relatively small, changes in relative phase are mostly due to changes in the object's position. A significant feature of the configuration shown in FIG. 1 is the high rejection of common mode errors. With sufficient phase lock loop gain, the laser phase noise and frequency drift are made common between the two lasers 102 and 110. Since the measurement involves a frequency and phase difference between the two lasers 102 and 110, the common laser errors are subtracted out, to first order. Furthermore, since the reference and sensing OPLLs use NCOs (140 and 144) that have a common clock (142), any jitter and drift in the clock (142) are also common errors that get subtracted out, to first order.

There is a second order effect that limits the rejection of common mode errors. For example, if there is a path length difference between the reference and sensing laser beams, then a temporal decorrelation will limit common mode rejection. For many applications this may not be an issue, but for applications that require sensing of the smallest possible displacement, nominal matching of the laser path lengths may be necessary. For one example, to obtain a minimum displacement of 1e-14 m/rt-Hz, the path length difference between the reference and sensing beams need to be less than 4 mm when semiconductor lasers are employed.

Free running laser phase noise and drift will be many orders magnitude larger than the minimum detectable phase required for high resolution displacement sensing. To reject laser phase noise and drift from the displacement measurement, it may be critical that the slave laser 110 is phase locked to the master laser 102 with a high bandwidth loop (>100 kHz) and that there is sufficient relative phase stability between the reference beat signal and the first NCO 144 output signal. For reference OPLL 127 shown in FIG. 1, voltage drift errors in the analog electronics can result in a drift in the reference beat signal phase relative to the first NCO 144 signal. The impact of analog electronic drift errors can be minimized with putting sufficient gain into the digital loop filter, which does not have drift errors due to its digital nature. However, having digital processing within the primary reference OPLL 127 may introduce too much delay that will limit loop bandwidths to unacceptable levels.

Figure 2:
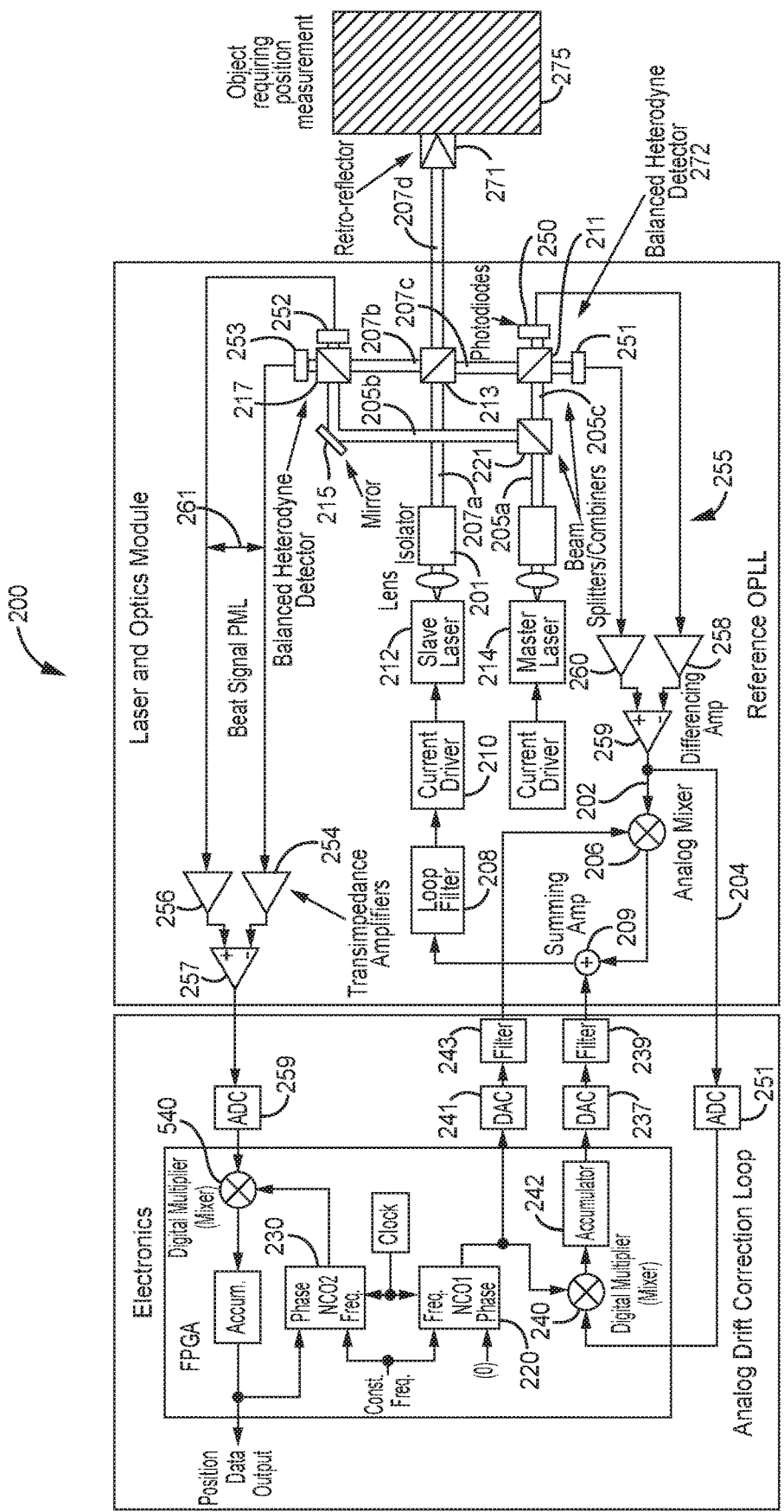
FIG. 2 is a block diagram of another interferometer according to one exemplary embodiment using an analog phase lock loop.

A solution is provided in the embodiment 200 of FIG. 2. All analog phase lock loops can typically be much faster than PLLs that involve digital signal processing in the main loop path because the analog loops do not have the long delays associated with digital electronics. On the other hand, analog loops have issues with analog drift errors. The circuit shown in FIG. 2 combines a primary analog PLL for the high bandwidth with a secondary digital loop that corrects the analog drift errors.

In this example embodiment, a master laser beam 205a from the master laser 214 is split by beam splitter/combiner 221 into a first split master laser beam 205b and a second master laser beam 205c. A slave laser beam 207a from the slave laser is split into two beams, beam 207d and beam 207c. Beam 207d is reflected off a retro-reflector 271 attached to the object 275. A portion of the reflected beam 207d is then reflected by beam splitter 213 to form beam 207b, which is directed to beam combiner 217. In an embodiment, beam splitter 213 always splits the beam into two paths. For the reflection beam 207d, it sends some light, beam 207d to beam combiner 217 and some light back towards the slave laser 212. This is one of the reasons for the use of an optical isolator 201 illustrated in FIG. 2. The first split master laser beam 205b is reflected off mirror 215 and split and combined with split and combined first reflected slave laser beam 207b via beam splitter combiner 217 to from two paths, one to photodiode 253 and one to photodiode 252 which make up the balanced heterodyne detector in this embodiment. An output of photodiode 253 is coupled to an input of a first sensing amplifier 254 and an output of photodiode 252 is coupled to an input of a second sensing amplifier 256. Outputs of the first sensing amplifier 254 and the second sensing amplifier 256 are coupled to respective inputs of a sensing differencing amplifier 257. An output of the sensing differencing amplifier 257 is coupled to an ADC 259 which in turn in communication with a mixer in an electronic circuit similar to interferometer 100 discussed above.

The second master laser beam 205c is combined and split with the second reflected slave laser beam 207c via beam splitter/combiner 211 onto two paths. The first path includes a first photo diode 250 and the second path includes a second photo diode 251 that make up a balanced heterodyne detector. An output of the first photo diode 250 is coupled to a first amplifier 258 and an output of the second photo diode 251 is coupled to a second amplifier 260. An output of the first amplifier 258 and the second amplifier 260 are coupled respectfully to inputs of a differencing amplifier 259. An output of the differencing amplifier 259 is coupled to an input of first mixer 206 and an analog to digital converter 251. An output of the analog to digit converter 251 is coupled to a second mixer 240. The second mixer 240 has another input that is coupled to an output of the first NCO 220. An output of the second mixer 240 is coupled to an input of an accumulator 242. An output of the accumulator 242 is coupled to a DAC 237. An output of the DAC 237 is coupled to a filter 230. An output of the filter 230 is provide to an input of a summing amplifier 209. The output of the first NCO 220 is further coupled to DAC 241. An output of DAC 241 is couple to filter 243. An output of filter 243 is couples to another input to analog mixer 206. An output of summing amplifier 209 is coupled to loop filter 208. An output of loop filter 208 is coupled to the current driver 210 of the slave laser 212.

The reference beat note is split into two paths 202 and 204 of the reference OPLL 255, one that goes to an analog mixer 206, and the other that goes to the digital electronics. The output of the analog mixer 206 goes to a loop filter 208 and then the current driver 210 and slave laser 212 to complete a high bandwidth PLL. If there are analog errors, the phase of the beat note signal just before the analog mixer 206 will not be exactly 90 degrees from the phase of the first NCO 220. This phase error will be detected at the digital mixer 240 which will output an error signal to the accumulator 242 in the analog drift correction loop. The accumulator 242 will drive the DAC 237 to output a voltage that is equal and opposite to the net analog errors referenced to the summing amplifier 209, thus cancelling out the analog errors. Since the analog drift errors are typically driven by temperature, they vary relatively slowly, therefore the digital loop bandwidth requirement is far less than the analog loop.

FIG. 2 also shows some other differences from the embodiment shown in FIG. 1. Additional photodiodes 250, 251, 252 and 253 and transimpedance amplifiers 254, 256, 258 and 260 are added to the heterodyne detectors to form balance heterodyne detection, which provides some rejection of relative intensity noise. In particular a first balanced heterodyne detector is made from the pair of photodiodes 250 and 251 and a second balanced heterodyne detector is made from the pair of photodiodes 252 and 253. A first pair of paths in the reference OPLL 255 couple the first pair of photodiodes 250 and 251 to transimpedance amplifiers 260 and 258 in the reference and a second pair of paths in a beat signal phase measurement loop 261 couple the second pair of photodiodes 252 and 253 to transimpedance amplifiers 254 and 256. Another difference in this embodiment is that the slave laser 212 is sent to the object 275 rather than the master laser 214. This allows for reconfiguring the sensor for CW LiDAR operation without changing any hardware.

Figure 3:
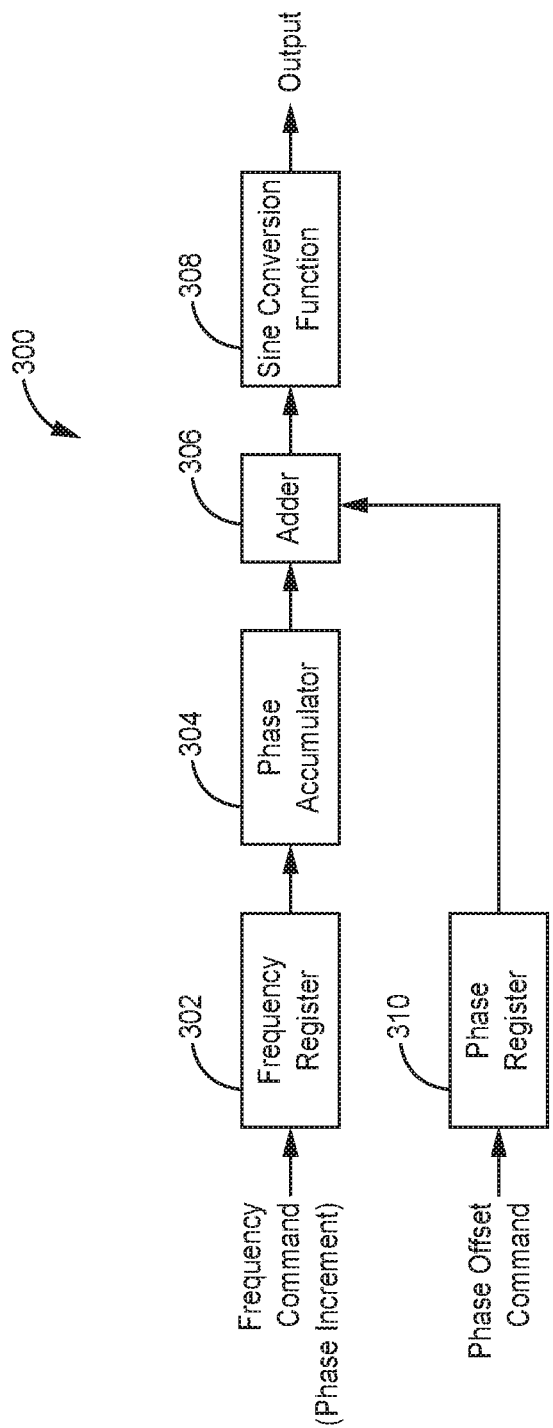
FIG. 3, is a function block diagram of a numerically control oscillator of the prior art.

FIG. 3 illustrated a block diagram of the basic NCO functions 300 of an NCO of the prior art used in embodiments, which has both frequency and phase command inputs. The frequency command goes through a frequency register 302 to a phase accumulator 304 which is clocked at a fixed rate. This provides a linearly changing phase with time for producing a sinewave at a specific frequency. The output of the phase accumulator 304 is then added with an adder 306 to the phase command through a phase register 310, which provides a phase offset for the sinewave. The output of the adder 306 then goes to a sine conversion function 308, such as a look up table. The extraordinary large linear range of the invention is due to the way the sensing beat note phase is measured. In principal, the displacement sensor output linear range is only limited by the size of the NCO phase register 310. For example, if the second NCO is configured such that a LSB corresponds to 1e-14 m, then a 64 bit phase register would correspond to a displacement range of about 180 km. The practical displacement range of the device will depend on the displacement that results the return sensing laser light dropping below some required minimum needed to meet sensing requirements.

Figure 4:
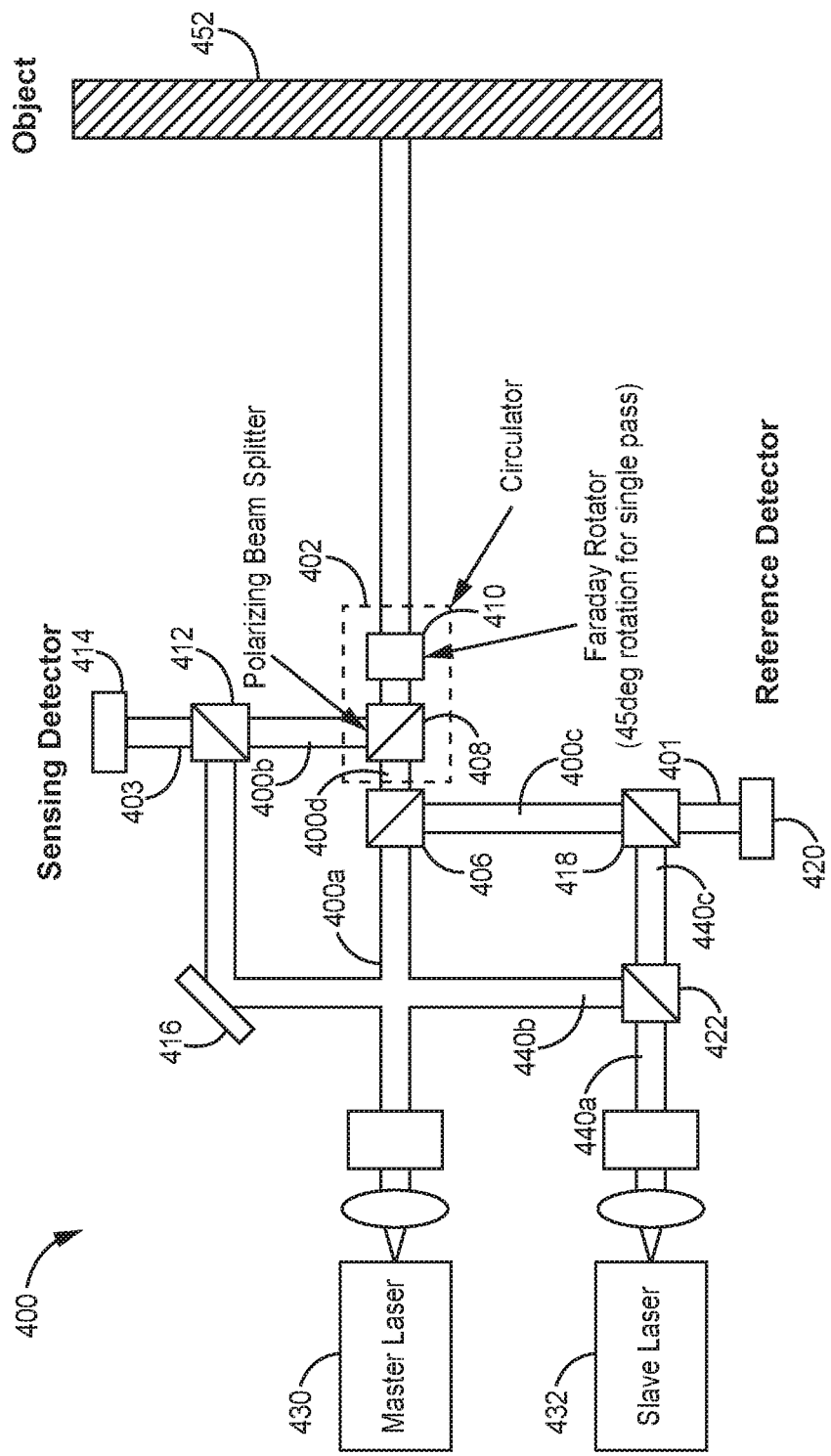
FIG. 4 is a block diagram of a laser an optics portion of interferometer according to one exemplary embodiment.

FIG. 4 illustrates a laser and optics portion 400 of an embodiment of an interferometer where an optical circulator 402 of the optical elements is used to divert, in theory, all of the master beam 400a to the object 152 and then all of the master beam reflected or backscatter by object 152 back to the sensing detector 414. This greatly reduces the amount of light going back to the master laser 430 and increases how much master light goes to the sensing detector 414. In practice, some light may be lost due to optical losses of the optical components.

The circulator 402 includes a beam splitter 408 and a faraday rotator 410. The maser laser beam 400a is directed to a beam splitter 406 which splits the master laser beam into two paths, one path is through the circulator 402 to the object 452 and the other path designated as 400c is to combiner 418. The master laser beam 400d that is reflected off of the object 452 is received back at the circulator 402 where the polarizing beam splitter directs the return signal to a combiner 412. The slave laser 432 generates a slave laser beam 440a that is directed to a beam splitter 422. The beam splitter 422 splits the slave laser beam into two paths, the first designated as 440b and the second designated as 440c. The slave laser beam first path 440b is directed to a mirror 416 which directs the laser beam to combiner 412 where it is combined with the master laser beam path 400b into a combined laser beam 403 which is directed to sensing detector 414. The slave laser beam second path 440c is directed to combiner 418 which combines it with the master laser beam second path 400c. The combined laser beams 401 are directed to the reference detector 402.

For displacement sensing, it doesn't matter if the master or the slave laser beam is sent to the object 452. If the sensor is configured to send the slave laser beam to the object, then the sensor can be easily switched between sensing displacement to CW LiDAR operation that allows for the measurement of absolute distance between the object and the sensor. For CW LiDAR operation, the frequency of first NCO is either chirped or modulated, which chirps or modulates the frequency of the slave laser 432 relative to the master laser 430. The sensing beat note phase measurement operation is also switched to control the frequency of second NCO rather than the phase. Switching between displacement sensing operation and CW LiDAR operation is all done in the digital firmware and therefore does not require any changes to the hardware.

Figure 5:
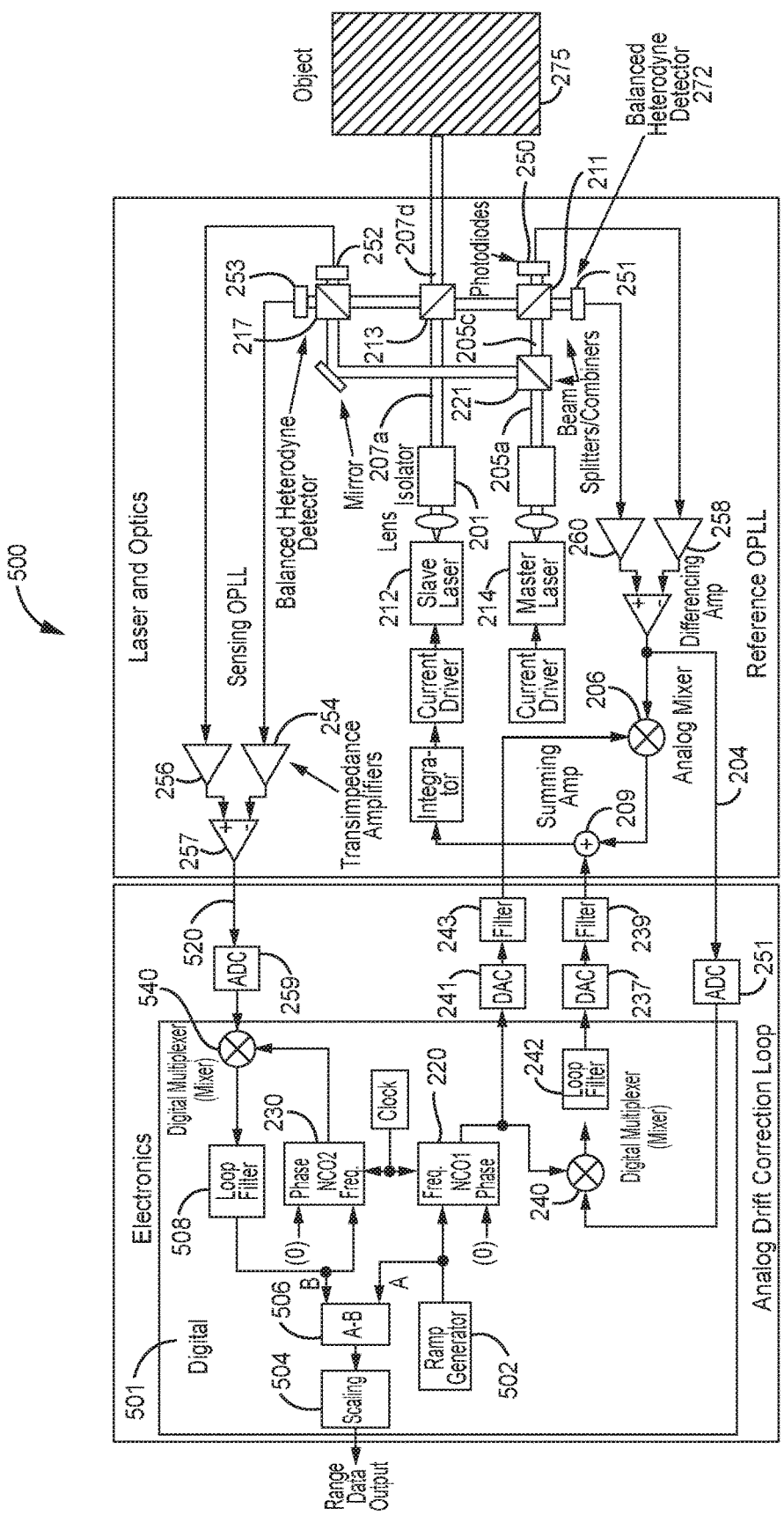
FIG. 5 is a block diagram of another interferometer according to one exemplary embodiment implementing.

Embodiments of the interferometer has many applications. For example, FIG. 5 shows an interferometer reconfigured for CW LiDAR operation. The only changes from the embodiment illustrated in FIG. 2 are found in the digital electronic circuit 501 of the electronic circuit portion of the interferometer 200. The digital electronic circuit 501 of the embodiment of FIG. 5 includes a ramp generator 502 whose output is coupled to the frequency input of the first NCO 220 and a subtractor 506. The subtractor 506 subtracts a signal from a loop filter 508 that is coupled to a mixer 540. The mixer 540 in turn receives a digitized sensing beat signal from the analog to digital converter 259. An output of the loop filter 508 is also coupled to the frequency input of the second NCO 230. An output of the subtractor 506 is coupled to a scaling circuit 504 which outputs the range data output of the CW LiDAR 500.

For the CW LiDAR operation, the frequency of first NCO 220 is chirped by the ramp or sawtooth generator 502. This causes the frequency of the slave laser 212 to change linearly with time relative to the master laser 214. The sensing beat signal frequency will also have a linear frequency ramp, but will be delayed in time due to the time it takes light to travel between the sensor and the object to be sensed. The sensing beat signal 520 is digitized by analog to digital converter 259, then sent to a digital mixer 540 where it is mixed with the output of second NCO 230, which is phase locked onto the sensing beat signal via control of the NCO frequency command input. The frequency difference between the first NCO 220 and the second NCO 230 is proportional to the distance or range between the sensor and the object 275. When the sensor is operating in displacement mode, as shown in FIG. 2, the absolute distance between the sensor 500 and the object 275 is not known, only the displacement of the object is measured. By switching to CW LiDAR mode as shown in FIG. 5, the absolute distance between the object 275 and the sensor 500 is measured. Typically, the minimum resolution of the distance measurement is far greater than the minimum resolution of the displacement measurement.

There are applications where both absolute distance and displacement of an object must be known, but the uncertainty in absolute distance can be much larger than the uncertainty in displacement.

More than one displacement or CW LiDAR channel can be supported without having to add additional lasers. For multiple sensing channels, only additional heterodyne detectors, collimating optics and sensing digital channels need to be added.

Figure 6:
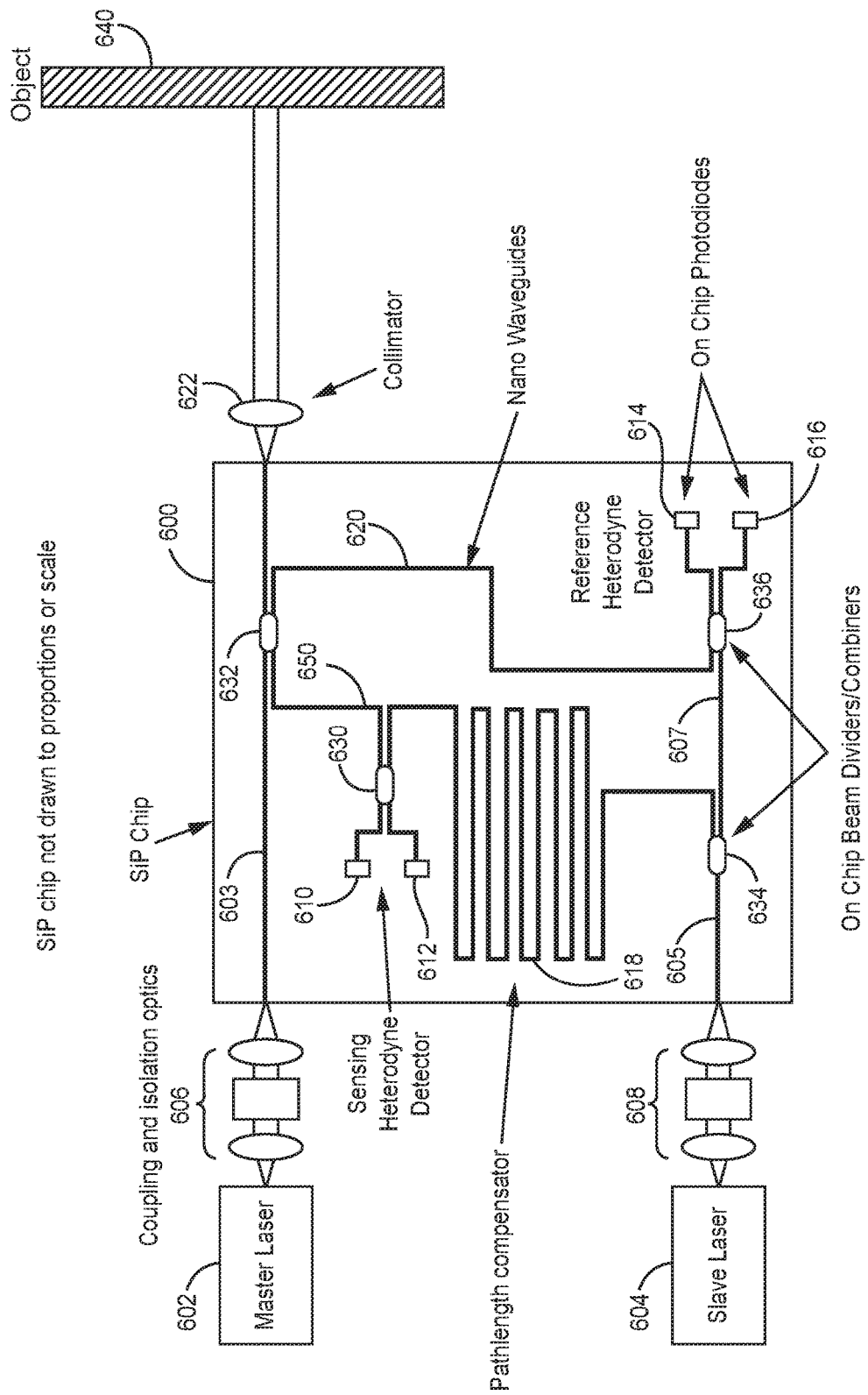
FIG. 6 is a block diagram of a laser and optics portion of an interferometer according to one exemplary embodiment employing a silicon photonics chip.

FIG. 6 shows an embodiment that employs a silicon photonics (SiP) chip 600 to replace many of the beam combiners, beam dividers and photodiodes of the optical elements in a displacement sensor of the laser and optics portion of an interferometer. Furthermore, additional functions can be added to the SiP chip 600, such as light intensity modulators and reference optical cavities for improving performance, without adding significant size, weight and cost to the device. Hence, in this embodiment, at least a portion of the laser and optics portion of the interferometer is formed on a SiP chip 600.

As illustrated in FIG. 6, a master laser 602 generates a master laser beam that is directed to a coupling and isolation optics 606 that direct the beam to a beam wave guide 603 in the SiP chip 600. A portion of the master laser beam is directed by the on chip beam divider/combiner to collimator 622 and then reflected off an object 640. The reflected master laser beam then passes through the collimator 622 to the on chip beam divider/combiner 632 where a portion of the reflected master laser beam is directed by wave guide 650 to chip beam divider/combiner 630. A portion of master light in waveguide 603 is also directed by beam divider/combiner 632 into waveguide 620, which directs the portion of master light to beam divider/combiner 636.

A slave laser 604 directs a slave laser beam to coupling and isolation optics 608. The optics 608 directs the slave laser beam to waveguide 605 in the SiP chip 600. The slave laser beam is then directed to chip beam divider/combiner 634 where a portion of the slave laser beam is directed through wave guide 618, through a path length compensator and to chip beam divider/combiner 630 where it is combined with a portion of the reflected master beam and provides to a sensing heterodyne detector made up of on chip photo detectors 610 and 612. Another portion of the slave laser beam is direct on waveguide 607 of the SiP chip 600 to on chip beam divider/combiner 636 where it is combined with a portion of the master beam from waveguide 603 and directed to a reference heterodyne detector made up of on chip photodiodes 614 and 616. Hence, this example embodiment uses two photodiodes for each heterodyne detector to form a balanced heterodyne detector, which helps reduce common amplitude noise on the laser light. The length of the path length compensator is set to minimize temporal decorrelation of common laser phase noise, and thus improving the signal to noise performance of the sensor.

Figure 7:
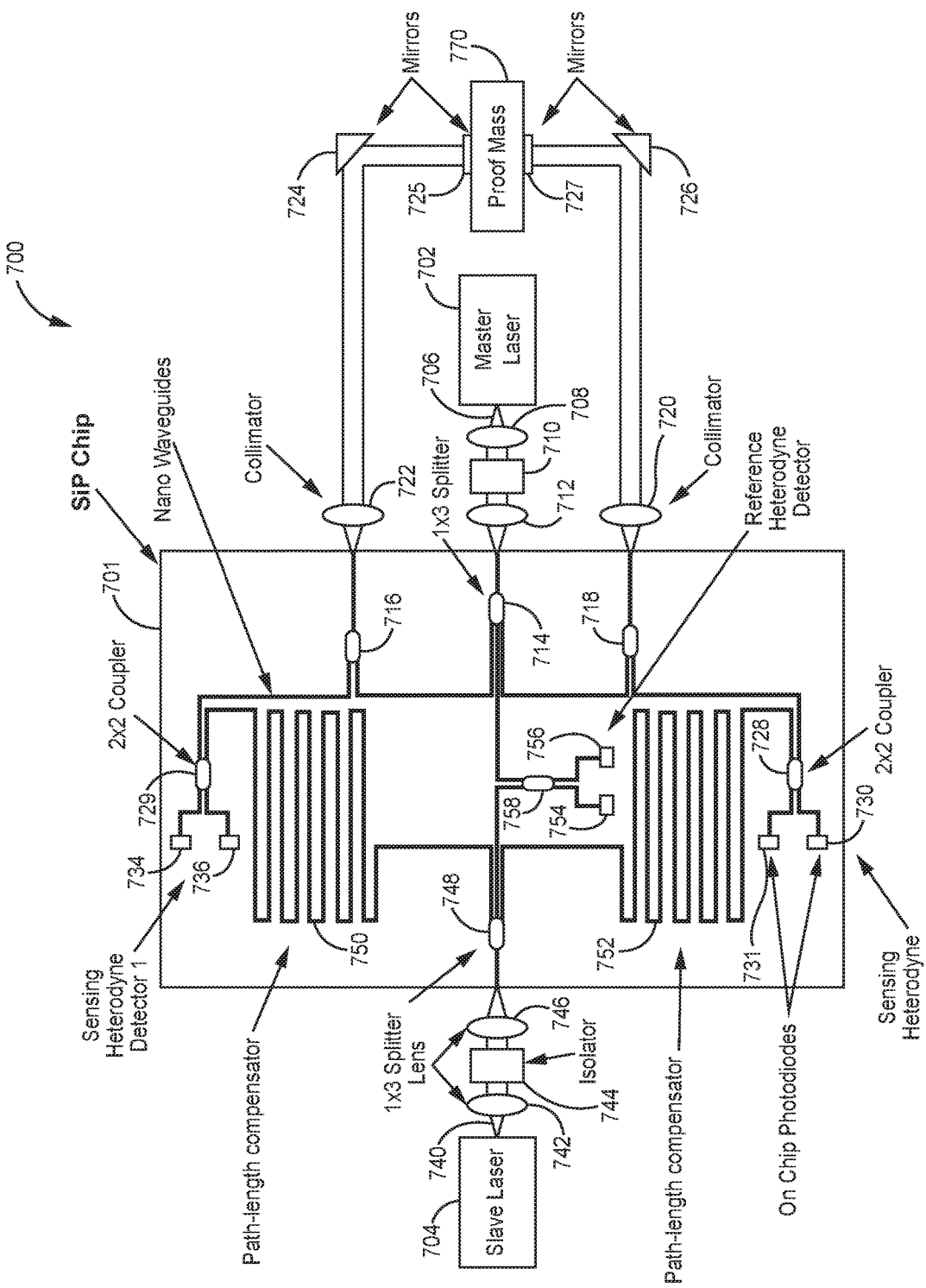
FIG. 7 is a block diagram of a laser and optics portion of an interferometer according to one exemplary embodiment configured as an accelerometer that employs a silicon photonics chip.

FIG. 7 shows an embodiment where the laser and optical portion 700 (displacement sensor) of an interferometer is used to form an accelerometer. The sensor 700 is used to measure the acceleration induced displacement of a proof mass 770 that is held by some type of suspension system (not shown). The master laser 702 is split into three paths, one for the reference OPLL and the other two for differential measurement of the accelerometer proof mass displacement. The slave laser 704 is also split into three paths, one for the reference OPLL and the other two for the two sensing heterodyne detectors. The electronics are not shown, but are the same as shown in the embodiment of FIG. 2, but there are two sensing channels, and thus second NCO and third NCO phase values that correspond to displacement sensed by each sensing beam.

In particular, the master laser 702 generates a master laser beam 706 in which lens 708, isolator 710 and lens 712 direct the beam along a waveguide in the SiP chip 701 to a 1×3 splitter 714 which splits the generated master laser beam 706 into three different wave guides. One of the wave guides directs a split master beam to chip beam divider/combiner 716, another wave guide directs a split maser laser beam to chip beam divider/combiner 718 while a third wave guide directs a split master beam to 2×2 coupler 758.

The chip beam divider/combiner 716 directs the split master beam to collimator 722. The split master beam is then reflected off a directing mirror 724 to mirror 725 attached to the proof mass 770 which reflects the split master beam back along the same path through the collimator 722 to the chip beam divider/combiner 716 where the reflected back split master beam is directed along a waveguide to a 2×2 coupler 729.

Similarly, chip beam divider/combiner 718 directs the split master beam to collimator 720. The split master beam is then reflected off a directing mirror 726 to mirror 727 attached to another side of the proof mass 770 which reflects the split master beam back along the same path through the collimator 720 to the chip beam divider/combiner 718 where the reflected back split master beam is directed along a waveguide to a 2×2 coupler 728.

The slave laser 704 generates a slave laser beam 740 that is directed through lens 742, isolator 744 and lens 746 into a waveguide in the SiP chip 701. The waveguide directs the slave laser beam to a 1×3 splitter which splits the slave laser beam into three different waveguides. One split slave laser beam is directed to the 2×2 coupler 758. The 2×2 coupler 758 is in communication with photodiodes 754 and 756 which make up a reference heterodyne detector.

Another of the split slave laser beam is directed along a waveguide that forms a first path length compensator 750 which leads to the 2×2 coupler 279. The 2×2 coupler 729 is in communication with photo diodes 734 and 736 that make up a first sensing heterodyne detector. Still another of the split slave laser beam is directed along a waveguide that forms a second path length compensator 752 which leads to the 2×2 coupler 278. The 2×2 coupler 728 is in communication with photodiodes 730 and 731 that make up a second sensing heterodyne detector.

The suspension system is designed in a way to confine movement of the proof mass in all directions except for the direction to be sensed by the displacement sensor. Under acceleration in the sensing direction, the proof mass 720 will move towards one of the sensing beams and away from the other. Acceleration is then proportional to the difference in the phase values of two NCOs used in the sensing beat note phase measurement loops. Additional common mode errors are removed by making a differential measurement of the proof mass displacement. For example, if the proof mass temperature changes, the proof mass size will either expand or contract. This change subtracts out when doing a differential measurement. To reject effects of thermal expansion on the waveguides or between the free space optical components, it is important that the various optical paths are laid out with symmetry and with matched lengths. Since, the displacement sensor has ultra-high sensitivity combined with a large linear range, there's more flexibility in the choices of implementations of the accelerometer proof mass suspension system.

As discussed above, embodiments lead to significant improvements to high performance accelerometers, which are used in navigation and platform stabilization applications. One typical configuration of a high performance accelerometer is a quartz proof mass that is suspended by quartz members. Under acceleration, the displacement of the proof mass will cause a strain in the suspension system that is detected by various means. A force rebalance system that uses a magnetic field generated by a coil is used to keep the proof mass in a neutral position. The output of the accelerometer is a measure of the electrical current applied to the rebalance coil. To obtain high linearity and sensitivity, the rebalance current must be measured with a precision digitizer. The invention can provide significant improvements over prior art by eliminating the need for a precision digitizer and allowing other configuration for the proof mass suspension system.

Since embodiments can provide a highly digital output of the displacement of the proof mass over a large displacement range, the digitizer and rebalance coil are not required. Furthermore, because of the high displacement sensitivity of the displacement sensor, other proof mass suspension configurations can be used, such as a stiffer suspension. A stiffer suspension leads to higher linearity over a wider range of acceleration, which may allow high performance accelerometers in very high-g applications such as gun-launch applications Other applications include seismometers. A seismometer also involves the displacement detection of a proof mass. The invention could lead to significant SWaP and cost reduction of seismometers, while maintaining or even improving very high sensitivity to seismic activity. Low cost, small SWaP but very high performance seismometers could play a significant role in border and perimeter defense and protection.

Other Applications include, but are not limited to, are high performance displacement sensors. Low cost, small SWaP but very high performance displacement sensors with the ability to scan may spur on new applications. Scanning the nano displacement of rubble may allow for the detection and location of survivors under the rubble. Scanning nano displacements of building walls and windows may allow for detection and location of human threats within a building or structure. Moreover, a very small, low power but high performance displacement sensor could also be mounted on a miniature drone. That combined with the ability to quickly switch from displacement sensing to LiDAR mode has potential in many applications and spurring on many new applications.

Another application for ultra-high performance displacement sensors is active isolation of seismic disturbances that can limit the detection capabilities of gravity wave detectors, such as the Laser Gravitational-Wave Observatory (LIGO).

Figure 8:
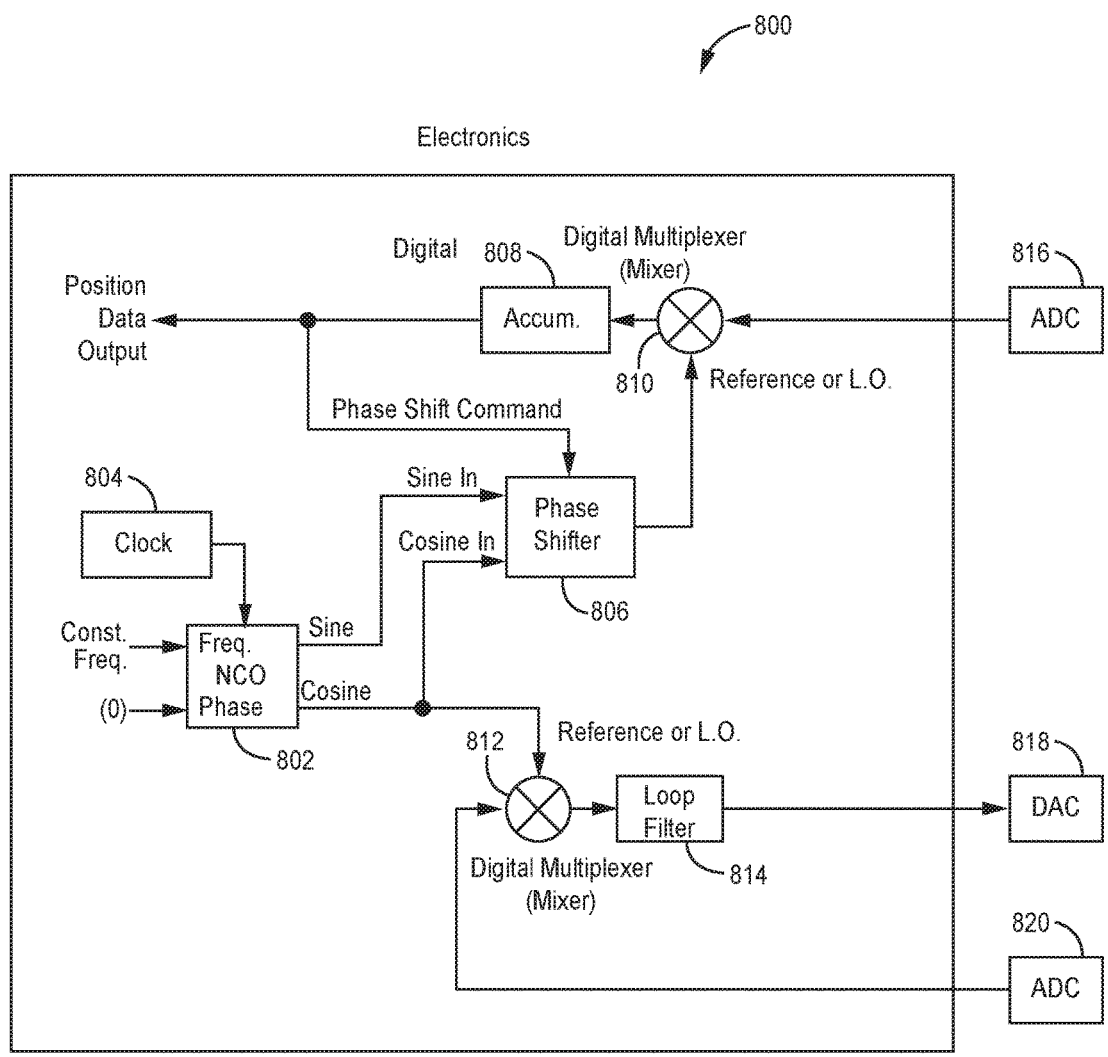
FIG. 8 is a block diagram of an electronics portion of an interferometer according to one exemplary embodiment implementing a single numerically controlled oscillator and phase shifter.

FIG. 8 shows an embodiment that uses phase shifter 806 in the electronics portion 800 of an interferometer so only one NCO 802 is needed. An output of a clock 804 is provided to the NCO 802. Sine and cosine outputs of the NCO are provided respectfully to sine in and cosine inputs of the phase shifter 806. The phase shifter 806 takes the sine and cosine inputs and outputs a sinewave that is phase shifted by a value proportional to the phase shift command to an input of a mixer 810. The phase shifter must be able to provide a smooth and highly linear phase shift over a very large phase shift range, such as +/−2e32 π. Another input to the mixer 810 is provided by ADC 816 that would be in communication with a laser and optics systems discussed above, such as being in communication with the sensing beat signal of the embodiment of the laser and optics system 96 FIG. 1. An output of the mixer 810 is provided to an input of an accumulator 808. An output of the accumulator 808 is provided as the position data output and a phase shift command input to phase shifter 806.

In addition, in this embodiment, the cosine output of the NCO 802 is provide as an input to mixer 812. Another input to mixer 812 is provided via ADC 820 which would be in communication with a laser and optics systems discussed above, such as being in communication with the reference beat signal of the laser and optics system 96 of the embodiment of FIG. 1. An output of the mixer 812 is provided to a loop filter 814. An output of the loop filter 814 is provided to a DAC 818 that is in communication with laser and optics systems discussed above, such as being in communication with the current driver 108 of slave laser 110 of the laser and optics system 96 of the embodiment of FIG. 1.

A possible method of phase shifting with the sum of a weighted sine and cosine of the embodiment of FIG. 8 includes the use of following equations:

$$c \cdot (a \cdot \sin(\omega t) + b \cdot \cos(\omega t)) = c \cdot \sqrt{a^2 + b^2} \cos(\omega t - \alpha)$$

$$\frac{b}{a} = \tan(\alpha)$$

problem is this blows up to ±∞ every ±

$$N \cdot \frac{\pi}{2}$$

To keep the amplitude of the phase shifted reference signal to the mixing at unity, $$c \cdot \sqrt{a^2 + b^2} = 1$$

The output of the accumulator 808 is essentially the phase α. When α approaches close to multiple values of +/−π/2, the ratio of b/a starts to blow up. For a practical phase shifter, there would need to be some algorithm that would flip the sign of the ratio of b/a in order to step the phase shifted reference signal into the adjacent phase quadrant, thus limiting the ratio of b/a to an acceptable finite value. The limit of b/a where the sign is flipped would be determined by the required phase resolution. Furthermore, it may be desirable to include some hysteresis in the sign switching limit of b/a to prevent noise in the α command value from causing rapid toggling of the b/a sign. The calculations of the a, b and c coefficients is probably best done with some type of microprocessor. To simplify the calculations, the coefficient a could be set to a constant, such as unity. Then following b and c coefficients are calculate as:

$$b = \tan(\alpha)$$

$$c = \frac{1}{\sqrt{a^2 + b^2}}$$

To generate a reference sinewave with unity amplitude and the desired phase shift, then the phase shifter performs the calculation shown above using the calculated coefficients a, b and c.

One disadvantage with only using one NCO 802 with phase shifter 806 is that it is difficult to get smooth phase control over a phase range much larger than +/−π/2. As just discussed above, some kind of algorithm needs to be performed to ensure a smooth transition through multiples of +/−π/2. The logic circuits that make up the phase shifter can introduce time delays, which can lead to temporal decorrelation of common phase noise. Furthermore, additional phase noise could be added to the phase shifted reference signal due to switching jitter of the phase shifter logical circuits.

Figure 9:
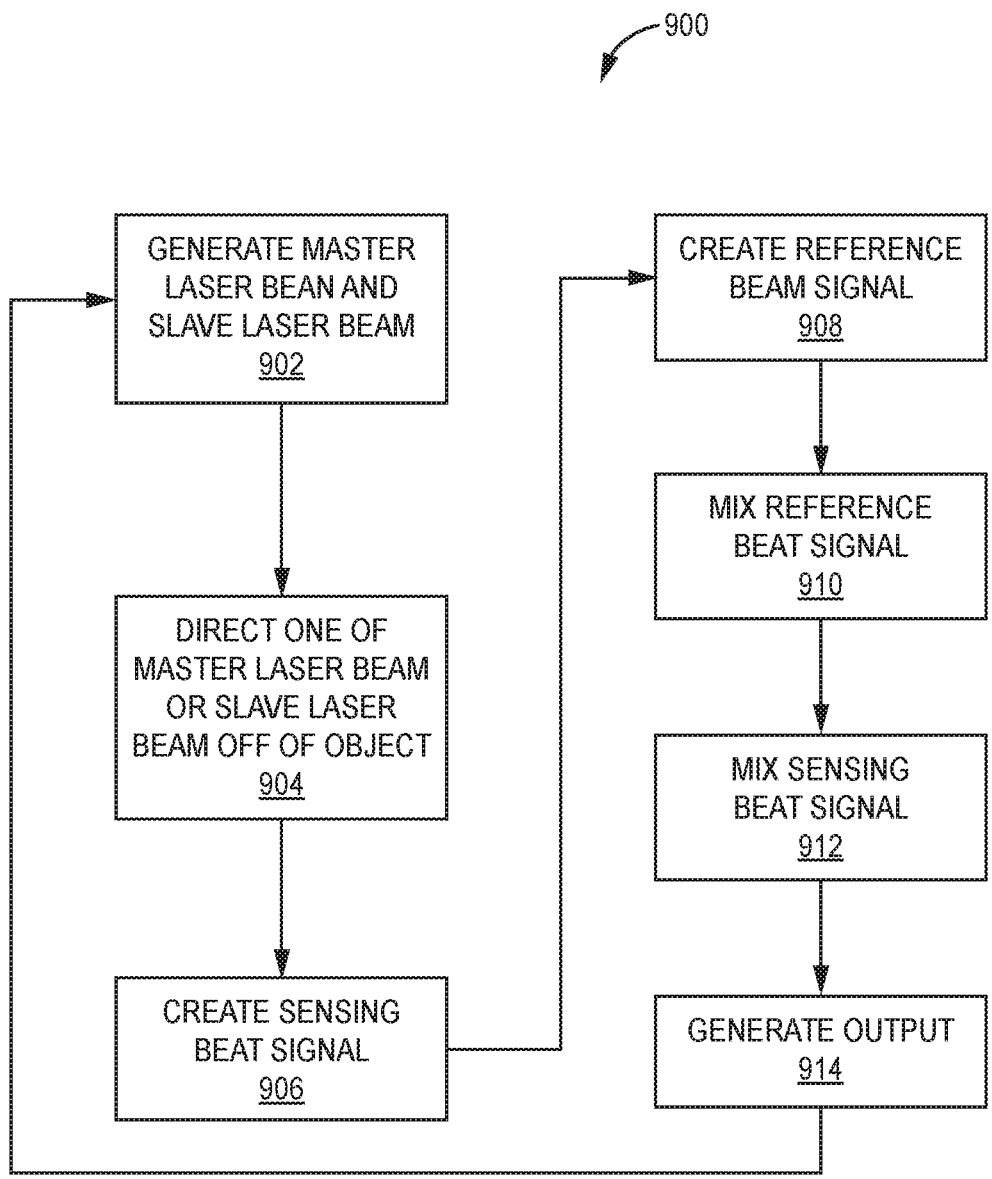
FIG. 9 is an operational interferometer flow diagram according to one exemplary embodiment.

An example of an operational interferometer flow diagram 900 is provided in FIG. 9. This flow diagram set out example steps that an interferometer embodiment may use in generating an output in light of the embodiments described above. The steps are provided in a sequential order. However, the sequence may occur in other order or may occur at the same time. Hence, embodiments are not limited to the sequence set out in FIG. 9.

Flow diagram 900 starts by generating a master laser beam with a master laser and a slave laser beam with a slave laser at step (902). Optical elements are used at step (904) to direct one of the master laser beam or the slave laser beam off an object. A sensing beat signal is created at step (906) with at least one sensing heterodyne detector with a beat note phase measurement loop from combined master and slave laser beam signals. A reference beat signal is created at step (908) with at least one sensing heterodyne detector in a reference optical phase lock loop from combined master and slave laser beam signals. The reference beat signal is mixed with an output of at least one oscillator at step (912) to at least in part control the operation of the slave laser. The sensing beat signal is mixed with an output of the at least one oscillator at step (914) to generate and output of the interferometer, wherein the output of the at least one oscillator is directly proportional to a phase of the sensing beat signal. The process continues at step (902).

In an embodiment, the mixing of the reference beat signal with an output of at least one oscillator to at least in part control the operation of the slave laser further includes, mixing the reference beat signal with an output of a first oscillator that receives a clock input from a clock. Moreover, the mixing the sensing beat signal with an output of the at least one oscillator further includes, coupling the output of the interferometer to a phase input of a second oscillator that also receives the clock input from the clock and mixing an output of the second oscillator to the sensing beat signal.

In an embodiment, the forming the reference optical phase lock loop and the sensing optical phase lock loop is done in an identical way using a same type of oscillator and the same clock. Moreover, as discussed above, at least some of the optical elements are formed in a silicon photonics chip.

EXAMPLE EMBODIMENTS

Example 1 is an interferometer that includes a laser and optics portion and an electronic circuit portion. The laser and optics portion includes a master laser, a slave laser and optical elements. The master laser is used to generate a master laser beam. The slave laser is used to generate a slave laser beam. The optical elements are configured and arranged to direct and combine the master laser beam and slave laser beam to provide a sensing beat signal to a beat signal phase measurement loop and a reference beat signal to a reference phase lock that is used at least in part to control the phase of the slave laser. The electronic circuit portion is coupled to receive the sensing beat signal and the reference beat signal. The electronic circuit includes a clock, at least one numerically controlled oscillator, at least one mixer and an interferometer output. The at least one numerically controlled oscillator has a clock input coupled to the clock. The at least one mixer has a first input to receive the sensing beat signal and a second input to receive an output of the at least one numerically controlled oscillator. The interferometer output coupled to receive an output of the at least one mixer.

Example 2, includes the interferometer of Example 1, wherein the at least one numerically controlled oscillator of the electronic circuit portion has an input coupled to receive a signal that is directly proportional to a change of phase of the sensing beat signal from an arbitrary initial phase.

Example 3 includes the interferometer of any of the Examples 1-2, wherein the electronic circuit portion further includes a phase shifter. The phase shifter has a first input coupled to receive a sine output from the at least one numerically controlled oscillator and a second input coupled to receiver a cosine output from the at least one numerically controlled oscillator. The phase shifter further has an output coupled to the at least one mixer and a third input coupled to receive an output of the at least one mixer.

Example 4 includes the interferometer of any of the Examples 1-3, wherein the at least one numerically controlled oscillator further includes a first numerically controlled oscillator and second numerically controlled oscillator. The clock input of each first and second numerically controlled oscillator is coupled to the clock. Further the at least one mixer includes a first mixer and a second mixer. The first mixer includes a first input that is coupled to receive the reference beat signal and a second input that is coupled to receive an output of the first numerically controlled oscillator. An output of the first mixer is used at least in part to control the slave laser. The second mixer includes the first input of the at least one mixer to receive the sensing beat signal, the second input of the at least one mixer to receive an output of the second numerically controlled oscillator, and the output of the at least one mixer.

Example 5 includes the interferometer of any of the Examples 1-4, further including at least one sensing heterodyne detector configured and arranged to provide the sensing beat signal and at least one reference heterodyne detector configured and arranged to provide the reference beat signal.

Example 6 includes the interferometer of Example 5, wherein the at least one sensing heterodyne detector includes a balanced heterodyne detector including a pair of photodiodes and the at least one reference heterodyne detector includes a balanced heterodyne detector including a pair of photodiodes.

Example 7 includes the interferometer of any of the Examples 1-6, wherein the optical elements include a circulator.

Example 8 includes the interferometer of any of the Examples 1-7, wherein the electronic circuit portion further includes a ramp generator and a subtractor. The ramp generator has output that is coupled to a frequency input of the at least one numerically controlled oscillator. The subtractor has a first input that is coupled to receive an output of the at least one mixer and second input coupled to the output of the ramp generator.

Example 9 includes the interferometer of any of the Examples 1-8, wherein a section of the laser and optics portion is formed on a silicon photonics chip.

Example 10 includes the interferometer of Examples 9, wherein the section of the laser and optics portion further includes at least one path length compensator, on chip photodiodes and on chip couplers.

Example 11 includes the interferometer of any of the Examples 1-10, further including at least one analog to digital converter to convert the sensing beat signal from the laser and optics portion of the interferometer from an analog signal to a digital signal used by the electronic circuit portion of the interferometer and at least one digital to analog converter to convert a digital control signal from electronic circuit portion of the interferometer to an analog signal used to control the slave laser of the laser and optics portion of the interferometer.

Example 12 includes the interferometer of any of the Examples 1-11, wherein the interferometer has at least one of accelerometer, seismometer, displacement sensors, LiDAR applications.

Example 13 includes interferometer Example including a laser and optics portion and an electronic circuit portion. The laser and optics portion includes a master laser to generate a master laser beam, a slave laser to generate a slave laser beam and optical elements. The optical elements are configured and arranged to direct and combine the master laser beam and slave laser beam to provide a sensing beat signal to a beat signal phase loop and a reference beat signal to a reference phase look loop used at least in part to control the phase of the slave laser. The electronic circuit portion is coupled to receive the sensing beat signal and the reference beat signal. The electronic circuit includes a clock, a first numerically controlled oscillator, a second numerically controlled oscillator, a first mixer, a second mixer and an interferometer output. The first numerically controlled oscillator has a clock input coupled to an output of the clock. The second numerically controlled oscillator has a clock input coupled to the output of the clock. The first mixer has a first input coupled to receive the reference beat signal. The first mixer has a second input coupled to an output of the first numerically controlled oscillator. The first mixer has an output used at least in part to control operation of the slave laser. The second mixer has a first input to receive the sensing beat signal and a second input to receive an output of the second numerically controlled oscillator. The interferometer output is coupled to receive an output of the second mixer. The interferometer output is further coupled to a phase input of the second numerically controlled oscillator.

Example 14 includes the interferometer of Example 13, further including at least one sensing heterodyne detector that is configured and arranged to provide the sensing beat signal and at least one reference heterodyne detector that is configured and arranged to provide the reference beat signal.

Example 15 includes the interferometer of Example 14, wherein the at least one sensing heterodyne detector includes a balanced heterodyne detector including a pair of photodiodes and the at least one reference heterodyne detector includes a balanced heterodyne detector including a pair of photodiodes.

Example 16 includes the interferometer of any of the Examples 13-15, wherein the optical elements include a circulator.

Example 17 is a method of operating an interferometer. The method includes generating a master laser beam with a master laser and generating a slave laser beam with a slave laser. Optical elements are used to direct one of the master laser beam and the slave laser beam off of an object. A sensing beat signal is created with at least one sensing heterodyne detector in a beat signal phase measurement loop from combined master and slave laser beam signals. A reference beat signal is created with at least one reference heterodyne detector in a reference optical phase lock loop from combined master and slave laser beam signals. The reference beat signal is mixed with an output of at least one oscillator to at least in part control the operation of the slave laser. Moreover, the sensing beat signal is mixed with an output of the at least one oscillator to generate and output of the interferometer, wherein the output of the at least one oscillator is directly proportional to a change of phase of the sensing beat signal from an arbitrary initial phase.

Example 18 includes the method of Example 17, further wherein the mixing the reference beat signal with an output of at least one oscillator to at least in part control the operation of the slave laser further includes, mixing the reference beat signal with an output of a first oscillator that receives a clock input from a clock and the mixing the sensing beat signal with an output of the at least one oscillator further includes, coupling the output of the interferometer to a phase input of a second oscillator that also receives the clock input from the clock and mixing an output of the second oscillator to the sensing beat signal.

Example 19 includes any of the Examples 17-18, further including forming the reference optical phase lock loop and the beat signal phase measurement loop in an identical way using a same type of oscillator and the same clock.

Example 20 includes any of the Examples 17-19, further including forming at least some of the optical elements in a silicon photonics chip.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An interferometer comprising:
    a laser and optics portion including,
        a master laser to generate a master laser beam,
        a slave laser to generate a slave laser beam, and
        optical elements configured and arranged to direct and combine the master laser beam and slave laser beam to provide a sensing beat signal to a beat signal phase measurement loop and a reference beat signal to a reference phase lock loop, the reference beat signal used at least in part to control the phase of the slave laser; and
    an electronic circuit portion coupled to receive the sensing beat signal and the reference beat signal, the electronic circuit including,
        a clock,
        at least one numerically controlled oscillator having a clock input coupled to the clock,
        at least one mixer having a first input to receive the sensing beat signal and a second input to receive an output of the at least one numerically controlled oscillator, and
        an interferometer output coupled to receive an output of the at least one mixer.

2. The interferometer of claim 1, wherein the at least one numerically controlled oscillator of the electronic circuit portion has an input coupled to receive a signal that is directly proportional to a change of phase of the sensing beat signal from an arbitrary initial phase.

3. The interferometer of claim 1, wherein the electronic circuit portion further comprises:
    a phase shifter, the phase shifter having a first input coupled to receive a sine output from the at least one numerically controlled oscillator and a second input coupled to receive a cosine output from the at least one numerically controlled oscillator, the phase shifter having an output coupled to the at least one mixer and a third input coupled to receive an output of the at least one mixer.

4. The interferometer of claim 1, further wherein:
the at least one numerically controlled oscillator includes a first numerically controlled oscillator and second numerically controlled oscillator, the clock input of each first and second numerically controlled oscillator coupled to the clock; and
the at least one mixer including a first mixer and a second mixer, the first mixer including,
a first input coupled to receive the reference beat signal,
a second input coupled to receive an output of the first numerically controlled oscillator, and
an output of the first mixer used at least in part to control the slave laser,
the second mixer including,
the first input of the at least one mixer to receive the sensing beat signal,
the second input of the at least one mixer to receive an output of the second numerically controlled oscillator, and
the output of the at least one mixer.

5. The interferometer of claim 1, further comprising:
at least one sensing heterodyne detector configured and arranged to provide the sensing beat signal; and
at least one reference heterodyne detector configured and arranged to provide the reference beat signal.

6. The interferometer of claim 5, further wherein:
the at least one sensing heterodyne detector includes a balanced heterodyne detector including a pair of photodiodes; and
the at least one reference heterodyne detector includes a balanced heterodyne detector including a pair of photodiodes.

7. The interferometer of claim 1, wherein the optical elements include a circulator.

8. The interferometer of claim 1, wherein the electronic circuit portion further comprises:
a ramp generator having an output coupled to a frequency input of the at least one numerically controlled oscillator; and
a subtractor having a first input coupled to receive an output of the at least one mixer and second input coupled to the output of the ramp generator.

9. The interferometer of claim 1, wherein a section of the laser and optics portion is formed on a silicon photonics chip.

10. The interferometer of claim 9, wherein the section of the laser and optics portion further comprises:
at least one path length compensator;
on chip photodiodes; and
on chip couplers.

11. The interferometer of claim 1, further comprising:
at least one analog to digital converter to convert the sensing beat signal from the laser and optics portion of the interferometer from an analog signal to a digital signal used by the electronic circuit portion of the interferometer; and
at least one digital to analog converter to convert a digital control signal from electronic circuit portion of the interferometer to an analog signal used to control the slave laser of the laser and optics portion of the interferometer.

12. The interferometer of claim 1, wherein the interferometer has at least one of accelerometer, seismometer, displacement sensors, LiDAR applications.

13. An interferometer comprising:
a laser and optics portion including,
a master laser to generate a master laser beam,
a slave laser to generate a slave laser beam, and
optical elements configured and arranged to direct and combine the master laser beam and slave laser beam to provide a sensing beat signal to a beat signal phase measurement loop and a reference beat signal to a reference phase lock loop used at least in part to control the phase of the slave laser; and
an electronic circuit portion coupled to receive the sensing beat signal and the reference beat signal, the electronic circuit including,
a clock,
a first numerically controlled oscillator having a clock input coupled to an output of the clock,
a second numerically controlled oscillator having a clock input coupled to the output of the clock,
first mixer having a first input coupled to receive the reference beat signal, the first mixer having a second input coupled to an output of the first numerically controlled oscillator, the first mixer having an output used at least in part to control operation of the slave laser;
a second mixer having a first input to receive the sensing beat signal and a second input to receive an output of the second numerically controlled oscillator, and
an interferometer output coupled to receive an output of the second mixer, the interferometer output further coupled to a phase input of the second numerically controlled oscillator.

14. The interferometer of claim 13, further comprising:
at least one sensing heterodyne detector configured and arranged to provide the sensing beat signal; and
at least one reference heterodyne detector configured and arranged to provide the reference beat signal.

15. The interferometer of claim 14, further wherein:
the at least one sensing heterodyne detector includes a balanced heterodyne detector including a pair of photodiodes; and
the at least one reference heterodyne detector includes a balanced heterodyne detector including a pair of photodiodes.

16. The interferometer of claim 13, wherein the optical elements include a circulator.

17. A method of operating an interferometer, the method comprising:
generating a master laser beam with a master laser;
generating a slave laser beam with a slave laser;
using optical elements to direct one of the master laser beam and the slave laser beam off of an object;
creating a sensing beat signal with at least one sensing heterodyne detector in a beat signal phase measurement loop from combined master and slave laser beam signals;
creating a reference beat signal with at least one reference heterodyne detector in a reference optical phase lock loop from combined master and slave laser beam signals;
mixing the reference beat signal with an output of at least one oscillator to at least in part control the operation of the slave laser; and mixing the sensing beat signal with an output of the at least one oscillator to generate an output of the interferometer, wherein the output of the at least one oscillator is directly proportional to a change in phase of the sensing beat signal from an arbitrary initial phase.

18. The method of claim 17, further wherein:

the mixing the reference beat signal with an output of at least one oscillator to at least in part control the operation of the slave laser further includes, mixing the reference beat signal with an output of a first oscillator that receives a clock input from a clock; and the mixing the sensing beat signal with an output of the at least one oscillator further includes, coupling the output of the interferometer to a phase input of a second oscillator that also receives the clock input from the clock and mixing an output of the second oscillator to the sensing beat signal.

19. The method of claim 17, further comprising:

forming the reference optical phase lock loop and the beat signal phase measurement loop in an identical way using a same type of oscillator and the same clock.

20. The method of claim 17, further comprising:

forming at least some of the optical elements in a silicon photonics chip.

* * * * *